United States Patent
Bajko et al.

(10) Patent No.: US 9,860,737 B2
(45) Date of Patent: Jan. 2, 2018

(54) COMMUNICATION SYSTEM AND METHOD

(71) Applicant: Nokia Corporation, Espoo (FI)

(72) Inventors: Gabor Bajko, Santa Clara, CA (US); Martti Perala, Oulu (FI); Kirsi Maansaari, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/580,701

(22) Filed: Dec. 23, 2014

(65) Prior Publication Data

US 2015/0111561 A1 Apr. 23, 2015

Related U.S. Application Data

(63) Continuation of application No. 12/625,516, filed on Nov. 24, 2009, now Pat. No. 8,948,725, which is a
(Continued)

(30) Foreign Application Priority Data

Mar. 22, 2002 (GB) .................................. 0206849.2

(51) Int. Cl.
*H04M 3/00* (2006.01)
*H04W 8/18* (2009.01)
(Continued)

(52) U.S. Cl.
CPC ....... *H04W 8/183* (2013.01); *H04L 29/12047* (2013.01); *H04L 61/15* (2013.01);
(Continued)

(58) Field of Classification Search
CPC ............. H04W 8/245; H04M 1/72525; H04M 1/72522
(Continued)

(56) References Cited

U.S. PATENT DOCUMENTS 5,649,301 A * 7/1997 Yabusaki ................ H04W 8/06
455/433
5,889,861 A * 3/1999 Ohashi ................... H04W 12/04
380/247
(Continued)

FOREIGN PATENT DOCUMENTS

JP 7-203544 A 8/1995
JP 2002-520923 T 7/2002
(Continued)

OTHER PUBLICATIONS

"Universal Mobile Telecommunications System (UMTS); IP Multimedia Subsystem (IMS); Stage 2 (3GPP TS 23.228 version 5.4.1 Release 5)", European Telecommunication Standard, Apr. 2002.
(Continued)

*Primary Examiner* — Nghi H Ly
(74) *Attorney, Agent, or Firm* — Mintz Levin Cohn Ferris Glovsky and Popeo, P.C.

(57) ABSTRACT

The invention relates to a communication system which comprises at least one user equipment having a plurality of identities associated therewith. The user equipment has means for storing at least one of the identities. Storage means are provided for storing at least one of the plurality of identities and means for receiving identity information from the user equipment, for obtaining from the storage means at least one identity associated with the received identity information and for sending to the user equipment the at least one obtained from the storage means.

18 Claims, 8 Drawing Sheets

Related U.S. Application Data continuation of application No. 10/508,136, filed as application No. PCT/IB03/01495 on Mar. 20, 2003, now Pat. No. 7,647,493.

(51) Int. Cl.
| | | |
|---|---|---|
| *H04L 29/12* | (2006.01) | |
| *H04W 60/00* | (2009.01) | |
| *H04L 29/06* | (2006.01) | |
| *H04W 8/04* | (2009.01) | |
| *H04W 80/10* | (2009.01) | |

(52) U.S. Cl.
CPC ....... *H04L 65/1006* (2013.01); *H04W 60/005* (2013.01); *H04L 65/1016* (2013.01); *H04W 8/04* (2013.01); *H04W 80/10* (2013.01)

(58) Field of Classification Search
USPC .......................... 455/418, 422.1, 414.1, 410
See application file for complete search history.

(56) References Cited

U.S. PATENT DOCUMENTS

| | | | |
|---|---|---|---|
| 5,901,352 A | 5/1999 | St-Pierre et al. | |
| 6,064,879 A | 5/2000 | Fujiwara et al. | |
| 6,618,858 B1 | 9/2003 | Gautier | |
| 6,725,269 B1 | 4/2004 | Megiddo | |
| 7,003,282 B1 | 2/2006 | Ekberg | |
| 7,277,702 B2* | 10/2007 | Ropolyi | H04L 63/00 370/352 |
| 7,328,046 B2 | 2/2008 | Koskelainen et al. | |
| 7,647,493 B2* | 1/2010 | Bajko | H04L 29/12047 709/238 |
| 8,948,725 B2* | 2/2015 | Bajko | H04L 29/12047 455/411 |
| 2001/0034767 A1* | 10/2001 | Aho | H04W 4/12 709/206 |
| 2001/0049786 A1 | 12/2001 | Harrison et al. | |
| 2001/0049790 A1* | 12/2001 | Faccin | H04L 63/104 713/185 |
| 2002/0012433 A1 | 1/2002 | Haverinen et al. | |
| 2002/0090950 A1 | 7/2002 | Uskela | |
| 2002/0111172 A1* | 8/2002 | DeWolf | G06Q 30/02 455/456.3 |
| 2002/0126701 A1 | 9/2002 | Requena | |
| 2002/0196775 A1* | 12/2002 | Tuohino | H04L 12/66 370/352 |
| 2003/0058855 A1* | 3/2003 | Feyerabend | H04L 29/06 370/389 |
| 2004/0003046 A1 | 1/2004 | Grabelsky et al. | |
| 2004/0015584 A1 | 1/2004 | Cartmell et al. | |

FOREIGN PATENT DOCUMENTS

| | | |
|---|---|---|
| JP | 4136946 | 6/2008 |
| WO | WO-98/48528 A1 | 10/1998 |
| WO | WO-00/02406 A2 | 1/2000 |
| WO | WO-00/65802 | 11/2000 |
| WO | WO-0139431 A2 | 5/2001 |
| WO | WO-0156245 A1 | 8/2001 |
| WO | WO-0156254 A1 | 8/2001 |
| WO | WO-02082729 A1 | 10/2002 |
| WO | WO-03081876 A1 | 10/2003 |

OTHER PUBLICATIONS

3GPP TS 23.228 v5.4.1 Release 5, Universal Mobile Telecommunications System (UMTS); IP Multimedia Subsystem (IMS); Stage 2, European Telecommunication Standard, Apr. 2002.
3GPP TS 24.228 v2.0; Technical Specification; 3rd Generation Partnership Project; Technical Specification Group Core Network; Signalling flows for the IP multimedia call control based on SIP and SDP (Release 5).
3GPP TS 33.203, V1.0.0 (Dec. 2001), 3rd Generation Partnership Project; Technical Specification Group SA3; Access secuirty for IP-based services (Release 5).
3GPP TS 23.228 V5.3.0; 3rd Generation Partnership Project, IP Multimedia Subsystem (IMS).
English translation of the Third Office Action, dated Dec. 11, 2009, issued by the State Intellectual Property Office of the People's Republic of China, issued in connection with counterpart application No. 038083671.
Japanese Office Action dated Oct. 25, 2007.
Vipin Samar, "Single Sign-On Using Cookies for Web Applications", Oracle Corporation, retrieved from the Internet: <http://ieeexplore.ieee.org/xpl/login.jsp?tp=&arnumber=805192&url=http%3A%2F%2Fieeexplore.ieee.org%2Fxpls%2Fabs_all.jsp%3Farnumber%3D805192>, pp. 158-163.

* cited by examiner

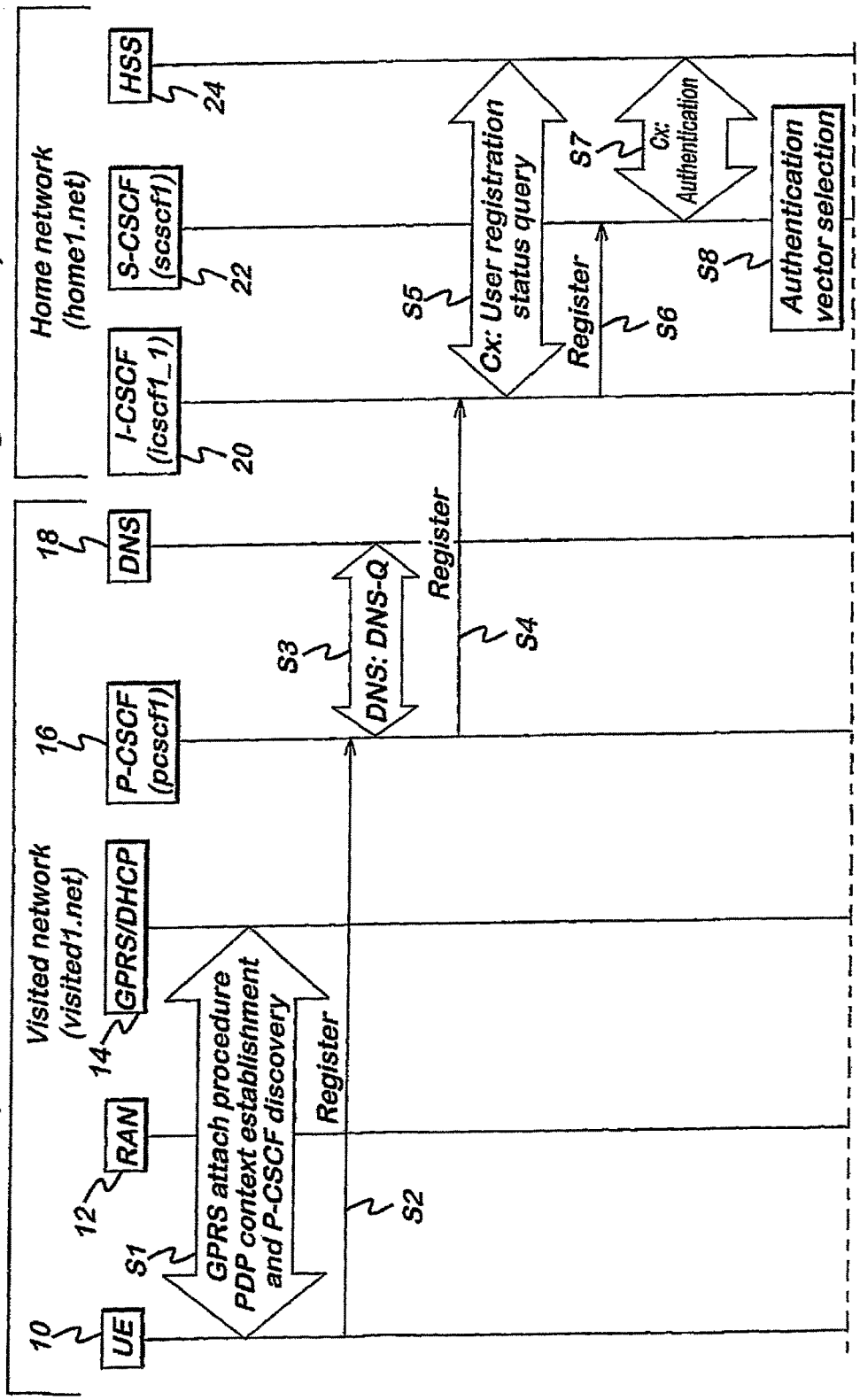
Fig. 2 Description of the relevant messages on the picture:

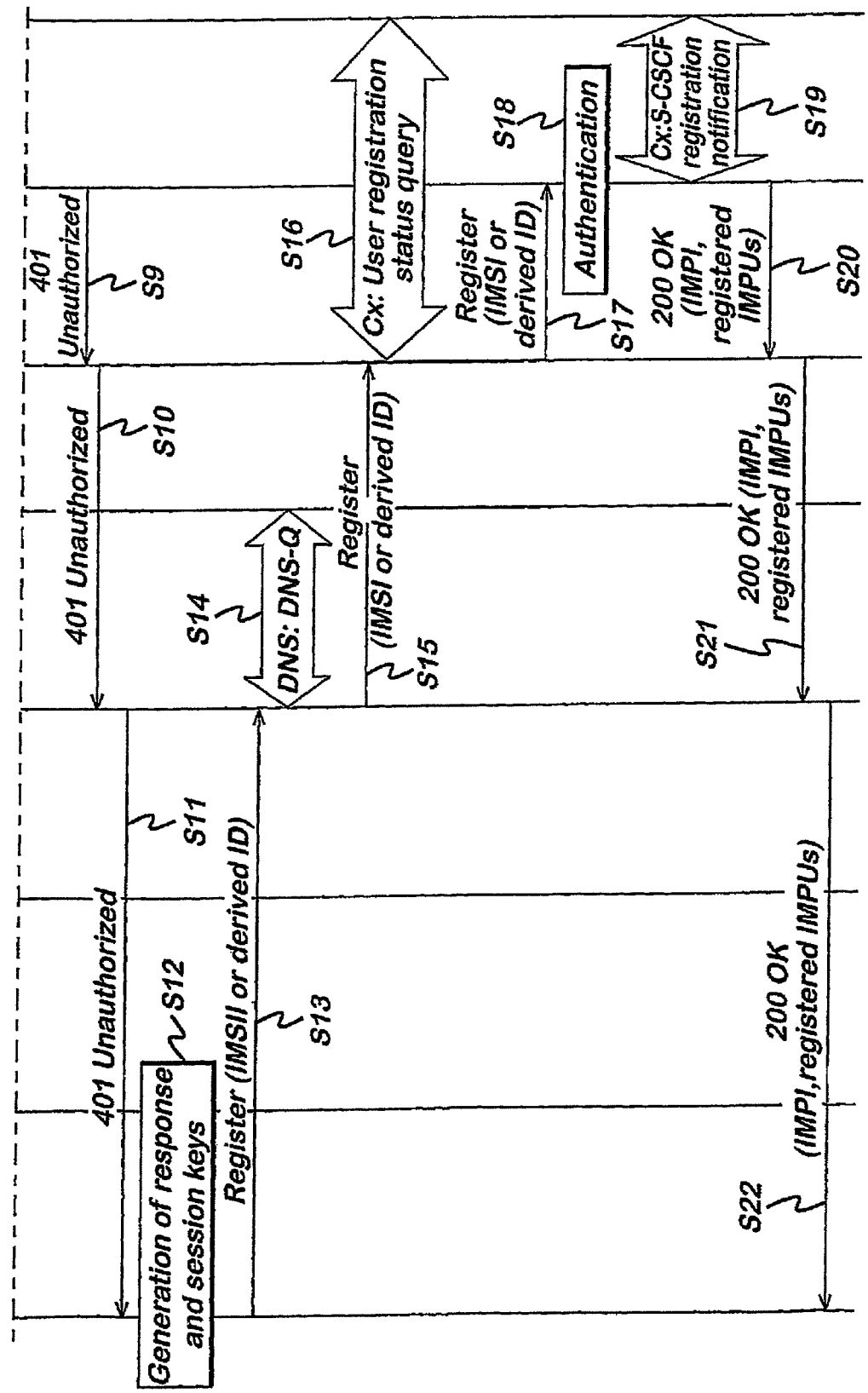
Fig. 2 (Contd.)

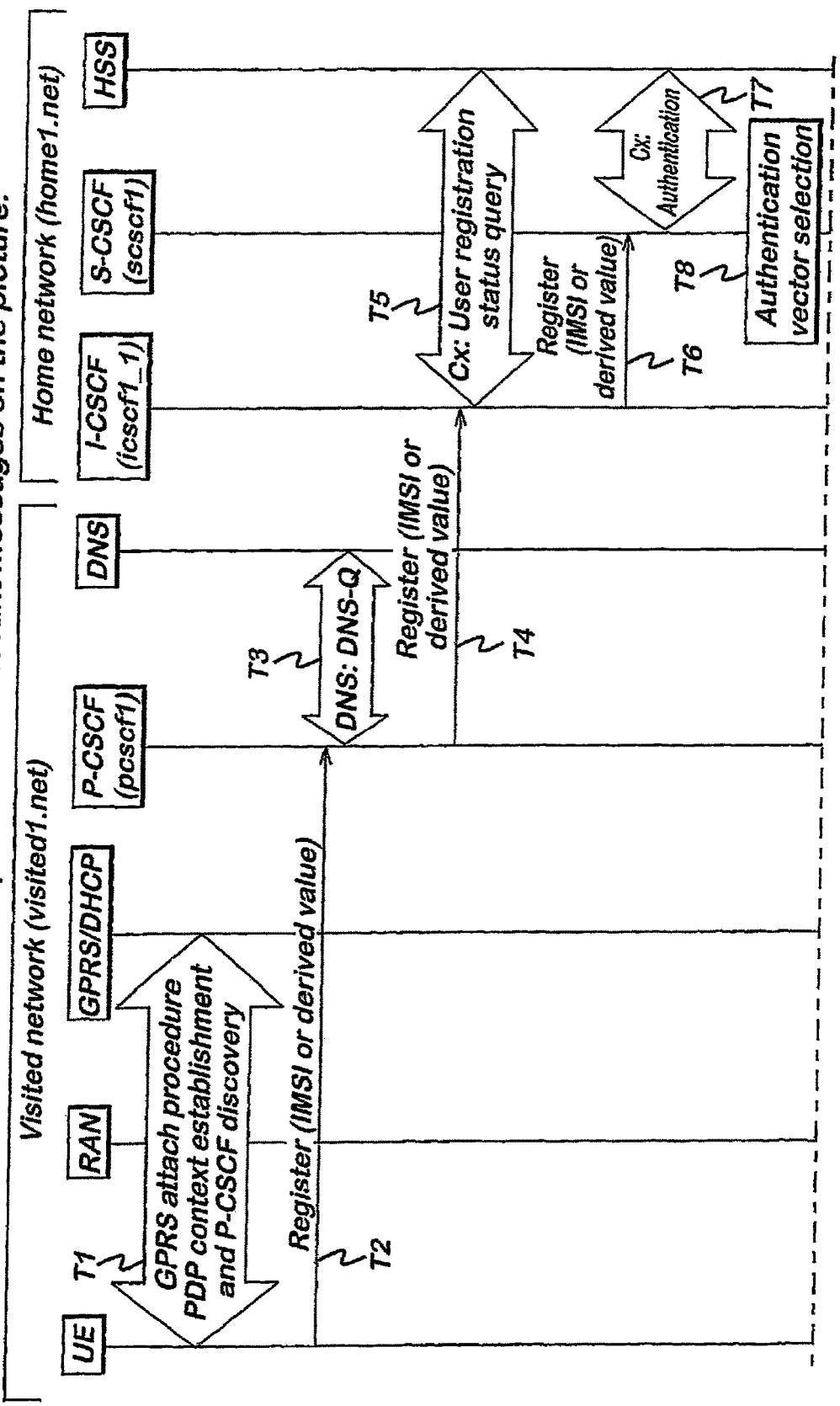

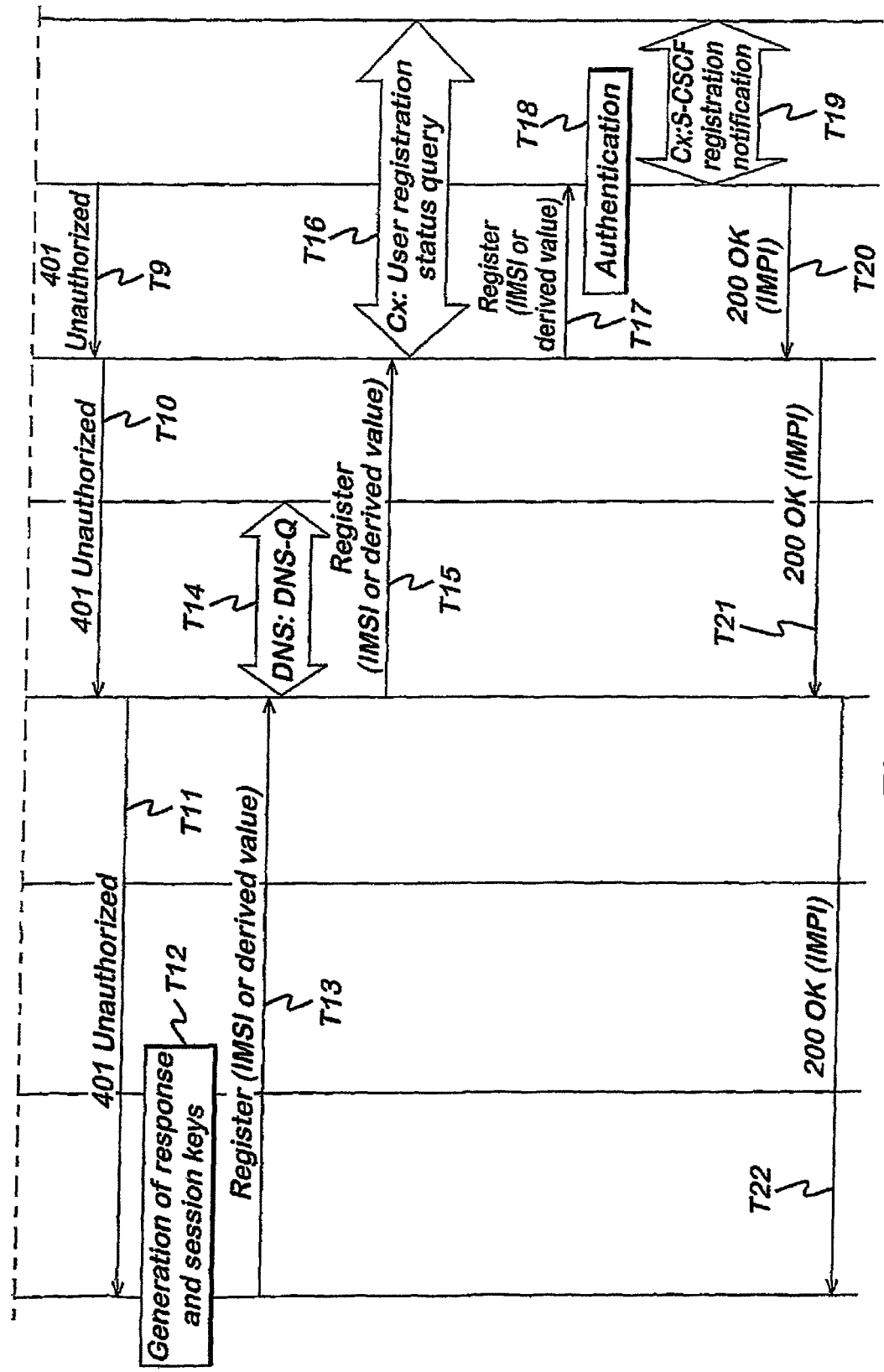
Fig. 3 (Contd.)

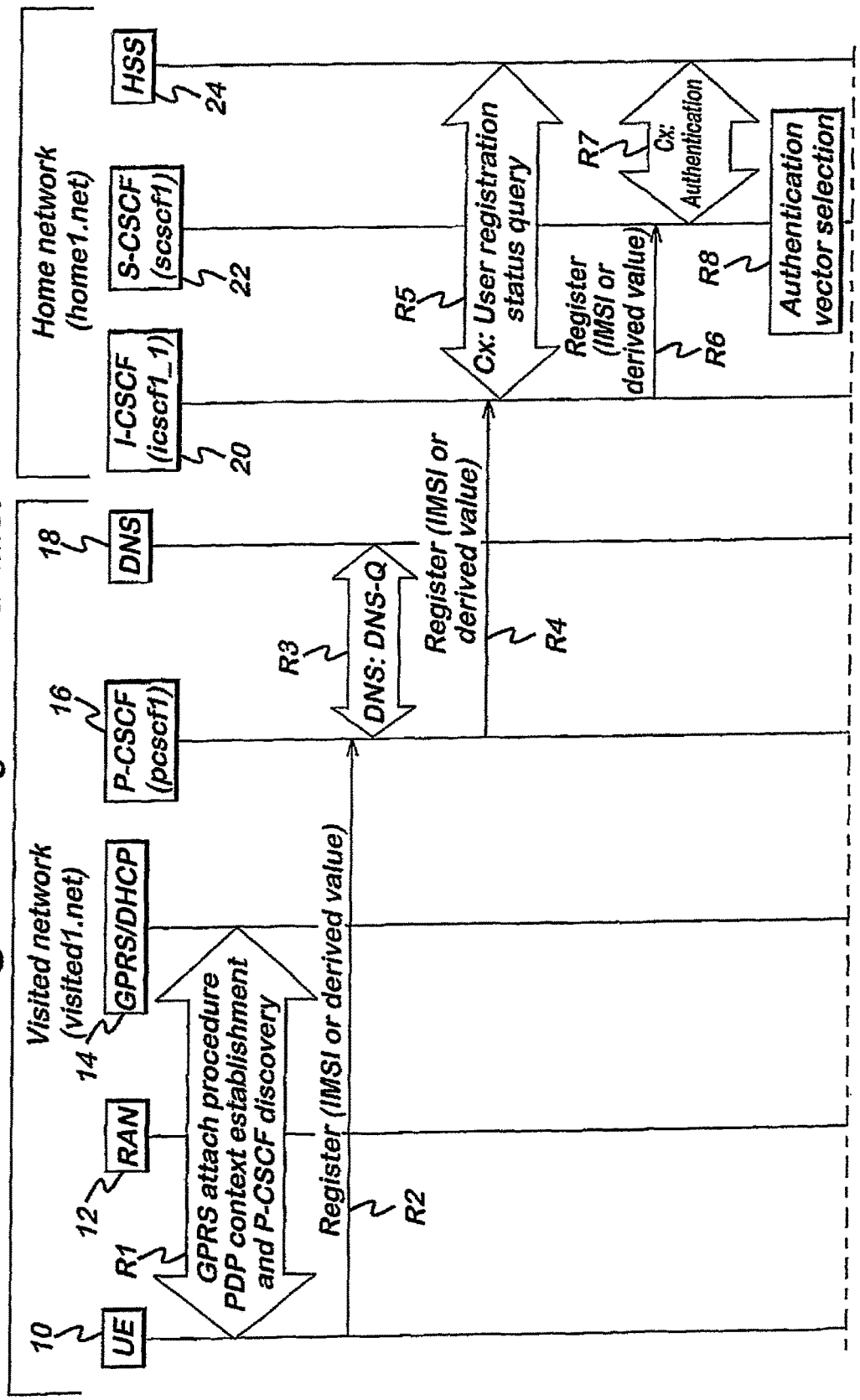
Fig. 4 UE registers with IMSI

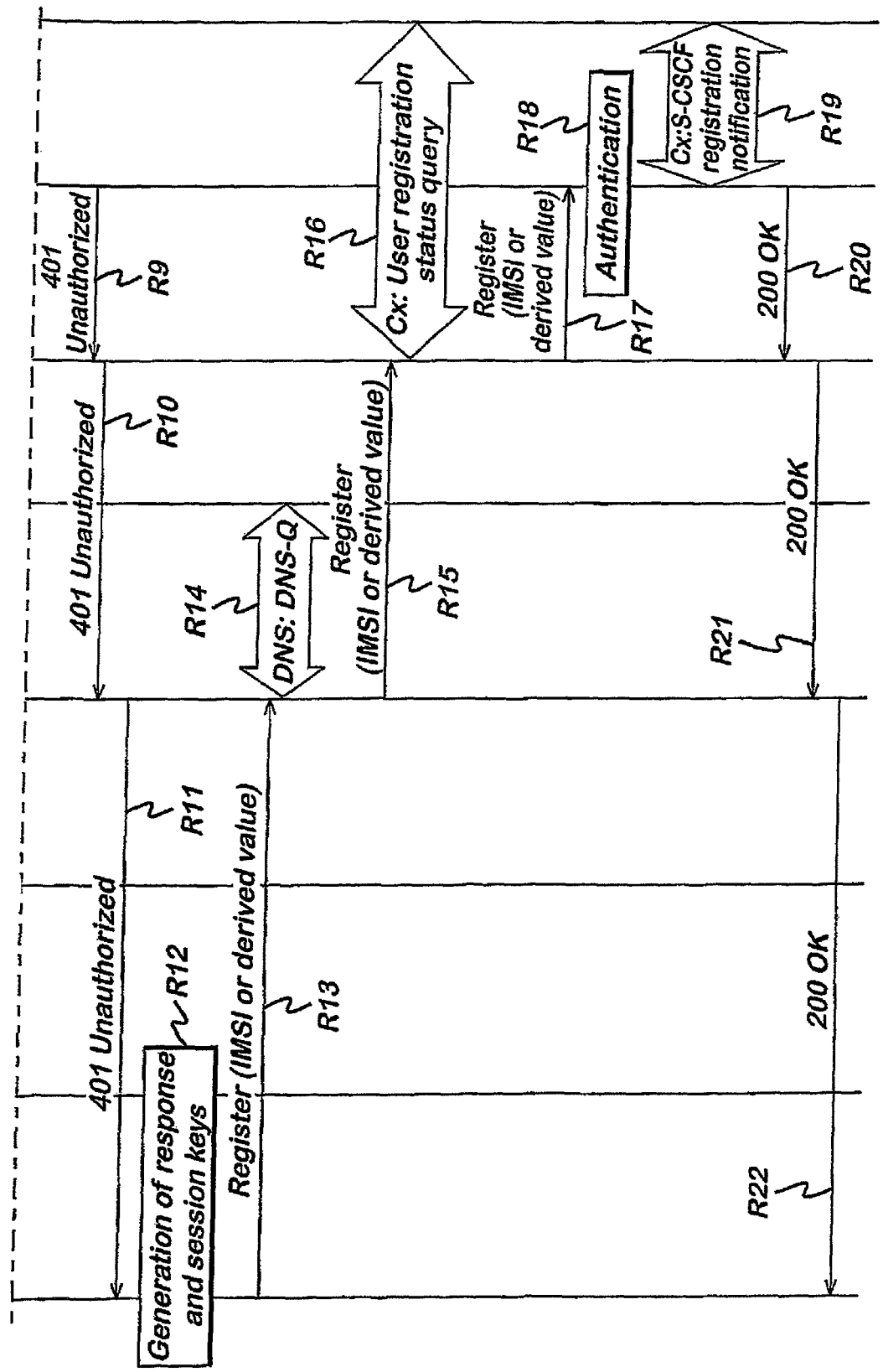
Fig. 4 (Contd.)

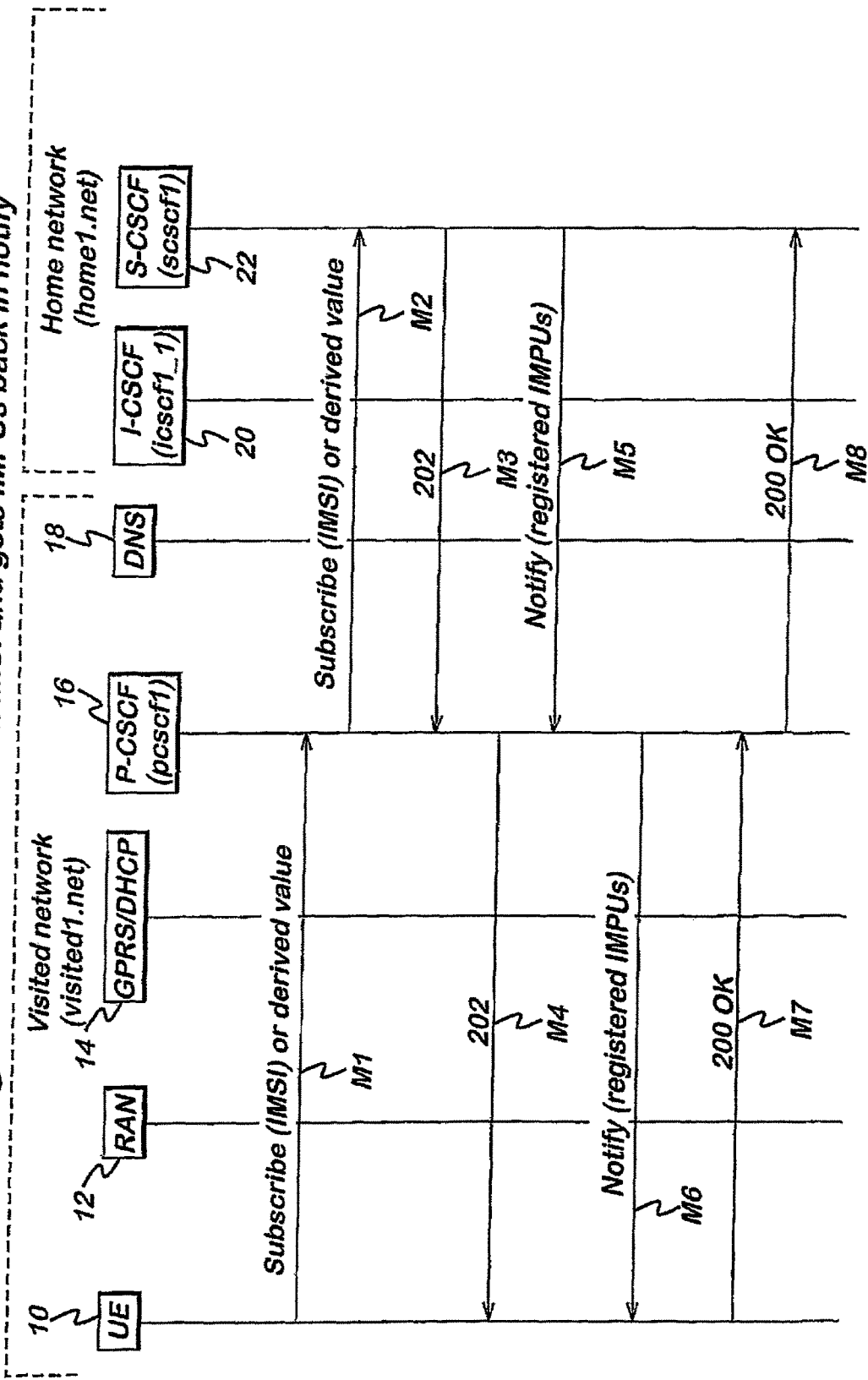

COMMUNICATION SYSTEM AND METHOD

CROSS REFERENCE TO RELATED APPLICATIONS

This application is a continuation and claims the benefit of priority under 35 U.S.C. §120 of co-pending U.S. patent application Ser. No. 12/625,516, filed Nov. 24, 2009, entitled "Communication System And Method," which is a continuation and claims the benefit of patent application Ser. No. 10/508,136, filed Nov. 10, 2004, now U.S. Pat. No. 7,647,493, entitled "Communication System And Method," which claims the benefit under 35 U.S.C. §371 of PCT/IB03/01495, filed Mar. 20, 2003 and United Kingdom Patent Application No. 0206849.2 filed on Mar. 22, 2002, all of which are hereby incorporated by reference in their entirety.

FIELD OF THE INVENTION

The present invention relates to a communication system and method.

BACKGROUND OF THE INVENTION

A communication system can be seen as a facility that enables communication between two or more entities such as user equipment and/or other nodes associated with the system. A communication system typically operates in accordance with a given standard or specification which sets out what the various elements of the system are permitted to do and how that should be achieved. For example, the standard or specification may define if the user, or more precisely the user equipment or terminal, is provided with a packet switch server and/or a circuit switch server. Communication protocol and/or parameters which are used for the connection may also be defined. In other words, a specific set of "rules" on which the communication can be based need to be defined to enable communication by means of the system.

Communication systems providing wireless communication for the user terminal or other nodes are known. An example of a wireless system is a cellular network. In cellular systems, a base transceiver station (BTS) or similar access entity serves mobile stations (MS) or similar wireless user equipment (UE) via a wireless interface between these entities. The operation of the base station and other nodes required for the communication can be controlled by one or several control entities. The various control entities may be interconnected. One or more gateway nodes may also be provided for connecting the cellular network to other networks such as to a public switched telephone network (PSTN) and/or other communication networks such as an IP (Internet protocol) and/or other packet switched networks.

A communication system may be adapted to provide wireless data communication services such as packet switched (PS) services for a mobile station. Examples of systems enabling wireless data communication services, without limitation to these, include the general packet radio service (GPRS), the enhanced data rate for GSM evolution (EDGE) mobile data network, the so-called third generation (3G) telecommunication systems such as the universal mobile telecommunication system (UMTS), I-phone or IMT-2000 (international mobile telecommunications) and the terrestrial trunked radio (TETRA) system.

In the third generation system, it has been proposed to provide a multimedia network architecture. It is intended that a multimedia architecture be able to handle different kinds of data such as voice, audio, video, data per se and indeed any other type of media. It has been proposed to have an IP (Internet protocol) multimedia subsystem for such a network architecture. Thus, the subsystem of the architecture is arranged to transfer data between the various entities in packet data form, in accordance with the Internet protocol.

The IP multimedia subsystem comprises all core network elements for provision of a multimedia service. This includes the collection of signalling and bearer related network elements. IP multimedia services are arranged to use the packet switch domain. The IP multimedia core network is arranged to enable PLMN operators to offer their subscribers multimedia services based on and built upon internet applications, services and protocols. It is intended that the IP multimedia core network subsystem should enable convergence of and access to voice, video, messaging, data and web based technology for wireless users.

The proposed third generation multimedia network architecture may have several different servers for handling different functions. These include functions such as the call state control functions (CSCFs). The call state control function may comprise functions such as a proxy call state control function (P-CSCF), interrogating call state control function (I-CSCF), and serving call state control function (S-CSCF). Control functions may also be provided by entities such as a home subscriber server (HSS) and various application servers.

In the currently proposed specification, Third Generation Partnership Project; Technical Specification Group Services and System Aspect; IP multimedia subsystem (IMS) stage 2, (release 5), which is herein incorporated by reference, there are various identities that may be associated with a user of an IP multimedia service. These identities include private user identity and public user identities. These identities are provided in an IM Subscribers Identity Module ISIM. Each ISIM is an application in the Universal Integrated Circuit Card UICC card of the user equipment. However, in earlier versions of the specification, the UMTS Subscriber Identity Module USIM application in the UICC card did not include these additional identities. UICC card which conforms to the previous versions of this standard (R99 or Rel-4) can be sold or owned by the subscriber. However, if a user of equipment which is in accordance with the Rel-5 version of the specification were to try to use an IP multimedia system, they would be unable to do so.

It has been suggested that the required IP multimedia subsystem identities be derived directly from the international mobile subscriber identifier (IMSI). However, this has the disadvantage in that this leads to security and optimisation problems. Additionally, the public user identities are not user friendly as john.smith@vodafone.com. Rather a public user identity derived from the IMSI would be something like 336574890@22081). Furthermore, additional data base searches would need to be carried out in order to check if the derived public and private user identities were valid.

SUMMARY OF THE INVENTION

It is therefore an aim of embodiments of the present invention to address or at least mitigate one of the problems described above.

According to a first aspect of the present invention there is provided a communication system comprising at least one user equipment having a plurality of identities associated therewith, said user equipment having means for storing at least one of said identities, storage means for storing at least one of said plurality of identities, means for receiving identity information from said user equipment, for obtaining from said storage means at least one identity associated with the received identity information and for sending to the user equipment said at least one identity obtained from said storage means.

According to a second aspect of the present invention there is provided a communication node for use in a communications system, said comprising means for receiving identity information from user equipment, means for obtaining from said storage means at least one identity associated with said user equipment based on the received identity information, and means for sending to the user equipment said at least one identity obtained from the storage means.

According to a further aspect of the present invention there is provided communication method comprising the steps of sending from user equipment identity information relating to said user equipment, obtaining at least one identity from storage means based on said identity information, and sending said obtained at least one identity to said user equipment.

BRIEF DESCRIPTION OF THE DRAWINGS

For a better understanding of the present invention and as to how the same may be carried into effect reference will now be made by way of example to the accompanying drawings in which:

FIG. 2 shows a first information flow in accordance with a first embodiment of the present invention;

FIG. 3 shows an information flow in accordance with a second embodiment of the present invention;

FIG. 4 shows an information flowing in accordance with a third embodiment; and

FIG. 5 shows a further signal flow used in conjunction with FIG. 4.

Figure 1:
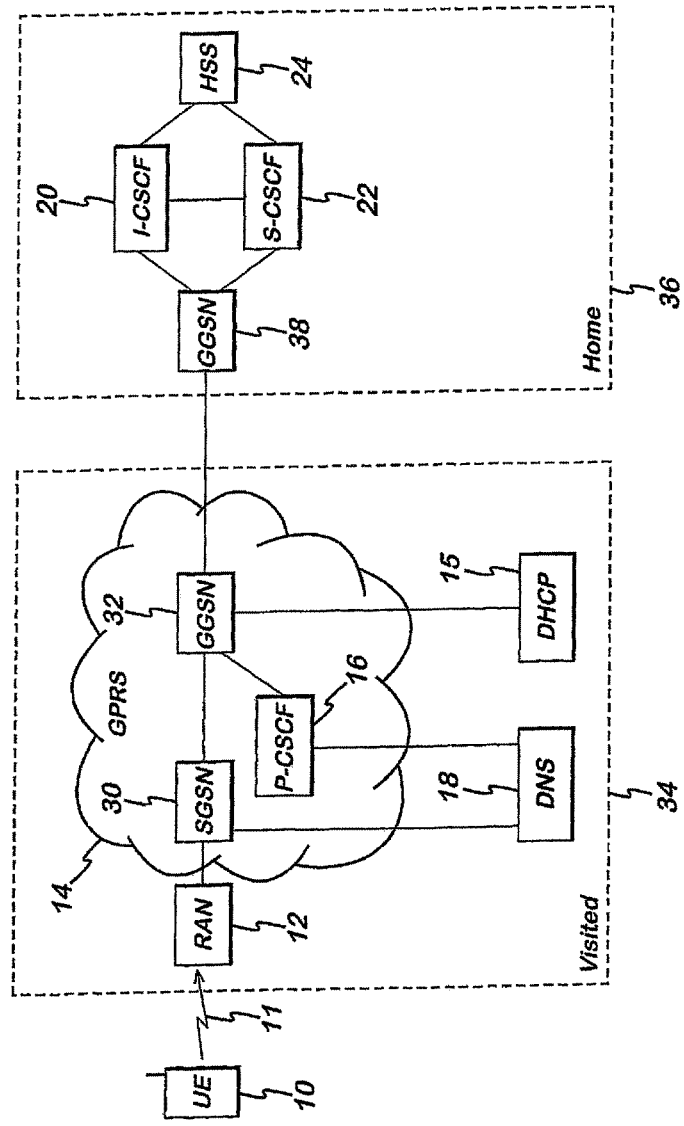
FIG. 1 shows a communication system architecture in which embodiments of the present invention can be incorporated.

DESCRIPTION OF PREFERRED
EMBODIMENTS OF THE PRESENT
INVENTION

Reference is made first to FIG. 1 which shows a possible network system architecture in which embodiments of the present invention can be incorporated. The exemplifying network system 10 is arranged in accordance with the UMTS 3G specifications. However, it should be appreciated that alternative embodiments of the present invention may be used with other third generation specifications or indeed any other suitable standard. A user equipment 10 is connectable to a radio access network 12. This connection between the user equipment 10 and the radio access network 12 is via a wireless connection 11. The user equipment 10 can take any suitable form and may for example be a mobile telephone, a portable computer, a personal digital assistant (PDA) or any other suitable wireless equipment. The wireless equipment may or may not be mobile. Embodiments of the present invention are applicable when the user equipment 10 attaches to a visited network that is not its network with which it is normally associated as well as when the user equipment attaches to its home network.

The radio access network 12 consists at least of a base station and usually also a controller. The radio access network 12 is connected to a GPRS core network. For example, the RAN 12 may be connected to a SGSN 30 (serving GPRS support node). The SGSN 30 in turn may be connected to a GGSN 32 (gateway GPRS support node). The SGSN and GGSN 32 constitute the GPRS core network 14. The GGSN 32 is connected to the DHCP (dynamic host configuration protocol) 15. The DHCP 15 is used to provide the user equipment 10 with the domain name of a proxy-CSCF node 16. The P-CSCF node 16 is connected to the GGSN 32. The DNS 18 is connected to the P-CSCF 16 and to the SGSN 30. The elements marked in block 34 can be regarded as being the visited network.

The home network is marked in block 36. The connection between the visited and home network is via the GGSN 32 of the visited network and a GGSN 38 of the home network. Between the two GGSNs 32 is a backbone network or other form of connection. The GGSN 38 is connected both to an I-CSCF 20 and an S-CSCF 22. Both of these CSCFs 20 and 22 are connected to the HSS 24. The S-CSCF is the serving call state control function and is the server currently serving at least one of the user equipment and is in control of the status of that user equipment. The home subscriber server entity 24 is used for storing registration identities, similar user related information and the public and private user identities as will be discussed in more detail hereinafter.

There are various identities that may be associated with the user of an IP multimedia (IM) Service. In an IM subsystem, the subscriber should have a private user identity (IMPI). The private identity is assigned by the home network operator and is used, for example, for registration, authorisation, administration and accounting purposes.

The identity may take the form of a network access identifier as defined in RFC 2486 This is an IETF (Internet engineering task force) standard. It is possible that a representation of the IMSI is contained within the network access identifier for the private identity. The private user identity is not normally used for routing of SIP messages. The private user identity may be contained in registration requests passed from the user equipment to the home network. The private user identity is preferably a unique global identity defined by the home network operator which may be used within the home network to uniquely identify the user from a network perspective. The private user identity may be permanently allocated to a user although in alternative embodiments of the present invention it may be dynamically allocated. It is preferably valid for the duration of the subscription with the home network. The private user identity may be used to identify the user's information such as authentication information stored within the HSS. The IMPI may be present in charging records based on operator policies. It should be appreciated that the IMPI identifies the subscription ie the IM service capability and not the user. The HSS and the C-SCCF need to obtain and store the private user identity in preferred embodiments of the present invention.

As far as public user identities are concerned, a subscriber to an IM subsystem shall have one or more public user identities IMPU. The public user identity or identities are used by any user for requesting communications to other users. For example, this might be included on a business card. Both telecommunication numbering and Internet naming schemes can be used to address users depending on the public user identity that the users have. The public user identity or identities may take the form of a SIPURL (as defined in RFC 2543 which is herein incorporated by reference) and RFC 2396 which is also incorporated by reference, or E.164 numbers, that is current phone numbers. It is possible in preferred embodiments of the present invention to register globally for example through a single request, a subscriber that has more than one public identity associated with it via a mechanism within the IP multimedia core network subsystem. This shall not preclude the user from registering individually some of their public identities if required. Public user identities do not need to be authenticated by the network during registration in preferred embodiments of the present invention. The public user identities may be used to identify the user information within the HSS.

It should be appreciated that the home network operator is responsible for the assignment of the private user identifier and the public user identifiers. It should be appreciated that some embodiments of the present invention may use other identifies that are not defined by the operator. All public user identities that are associated with the same service profile should have the same set of services. It should be appreciated that a given user may have more than one public user identity which are in turn associated with different service profiles. Each public user identity is only associated with a single service profile in preferred embodiments of the present invention.

Reference is now made to FIG. 2 which shows a first embodiment of the invention and in particular the signalling flows.

In the first step, S1 the following occurs: A GPRS attach procedure is followed, a PDP (packet data protocol) context is established and the P-CSCF discovery procedure is carried out. The GPRS attach procedure is the procedure by which the user equipment attaches itself the GPRS network. This is known and will not be described in further detail. The PDP context establishment procedure involves the establishment of the appropriate PDP context bearer using for example the PDP context establishment procedure as specified in the third generation specification 3GPPTS24.008, which is herein incorporated by reference. It should be appreciated that the establishment of the PDP context is known and will not be described in further detail here. In the P-CSCF discovery procedure, this is carried out after the attach procedure and afterwards is part of a successful activation of PDP context. This can use one of two mechanisms: In one procedure, the DHCP is used and optionally if required, the DNS in order to obtain the P-CSCF address. This procedure involves the user sending a request to a DHCP server. It may request a list of fully qualified domain names of one or more P-CSCFs and the IP addresses of the DNS servers or it may request a list of the P-CSCF IP addresses. If this does not provide the required P-CSCF address, the user equipment may send a query to the DNS server to retrieve a list of the P-CSCF IP addresses from which one is selected. If the response from the DNS server does not contain the IP addresses, an additional DNS query is needed to resolve the fully qualified domain name to an IP address.

It should be appreciated that this is by way of example only and any suitable procedure can be used to identify the correct address of the P-CSCF 16.

In step S2, a REGISTER request is send from the user equipment to the P-CSCF 16. The purpose of this request is to register the user's SIP (session internet protocol) uniform resource identifier with an CSCF 22 in the home network. This request is routed to the P-CSCF because it is the contact point to the IP Multimedia Subsystem for the user equipment.

In step S3, based on the user's uniform resource identifier URI, the P-CSCF 16 determines that the user equipment 10 is registering from a visiting domain and performs a Domain Name Server DNS 18 query to locate the I-CSCF 20 in the home network. The lookup in the DNS 18 is based on the address specified in the request URI.

In step S4, the P-CSCF 16 sends the register request, originating from the user equipment 10 to the I-CSCF 20 identified in step S3.

In step S5, the I-CSCF makes a request for information relating to the subscriber the user) registration status by sending a query to the HSS 24. The HSS sends back to the I-CSCF 20 the required capabilities. Based on this information, the I-CSCF 20 selects a suitable S-CSCF 22.

In step S6, the register message is sent by the I-CSCF 20 to the selected S-CSCF 22.

In step S7, an authentication procedure is carried out. On receiving a register request from an unauthorised user (that is a user which has not yet been authorised), the S-CSCF 22 requires at least one authentication vector be used in order to challenge the user. If a valid authentication vector is not available, then the S-CSCF 22 requests such a vector from the HSS. In this step, the S-CSCF also indicates to the HSS 24 that it has been assigned to serve the particular user.

In step S8, the S-CSCF 22 selects the vector for use in the authentication challenge.

In step S9, the S-CSCF 22 sends the authentication challenge to the I-CSCF 20. In step S10, the I-CSCF 20 forwards that challenge to the associated P-CSCF 16. In turn, the P-CSCF 16 sends the authorisation challenge in step S11 to the user equipment 10.

In step S12, the user equipment is arranged to generate response and session keys.

In step S13, the user equipment 10 obtains the international mobile subscriber identity IMSI from the USIM application in the Universal Integrated Circuit Card UICC card and includes it in the register message generated by the user equipment. This register request also includes the response to the user equipment. This register message contains integrity protection and thus, the IMSI information can be included in this message with better security than if it is included in the first register message (that is step S2). The register message is sent from the user equipment 10 to the P-CSCF 16. Step S14 is similar to S3 and ensures that the P-CSCF 16 sends the register message, in step S15, to the correct I-CSCF 20.

Step S16 and step S17 are similar to steps S5 and S6 described previously.

In step S18, the S-CSCF 22 checks the UE 10 authentication response and verifies that it is successful.

In step S19, once a user has been registered, by the S-CSCF 22, the S-CSCF 22 informs the HSS 24 that the user has been registered. The HSS may also include the user profile in the response sent back to the S-CSCF 22.

In step S20, if the authentication is successful, the S-CSCF includes the IMPI and/or registered IMPUs in the message sent to the user equipment. In step S20 the information is sent from the S-CSCF 22 to the I-CSCF 20. In step S21 that information is forwarded to the I-CSCF 20 to the P-CSCF 18. Finally, in step S21, the message is forwarded from the P-CSCF to the UE 10.

After the UE 10 has received the IMPI and/or IMPUs it will store them in the user equipment phone memory and use them as, defined in IMS specifications As the first register message does not include the IMSI, that message should include some information which allows the correct HSS 24 to be identified. For example, the user may be provided with an identification number for the HSS with which it is associated. It should be appreciated that in alternative embodiments of the present invention, alternative ways may be used to determine the correct HSS for the user.

It should also be appreciated that the messages sent in step S20, S21 and S22 may need to be modified to carry the public and private user identities.

Reference will now be made to FIG. 3 which shows an alternative embodiment of the present invention. Step T1 is the same as step S1 of FIG. 2.

In step T2 of FIG. 3, a similar function is carried out to that of step S2 of FIG. 2. However, the IMSI information or identifier derived therefrom may be included in the register message. This would allow the HSS for the given UE 10 to be identified. Steps T3 to T12 would be the same or similar as steps S3 to S12 of FIG. 2. The second register request in step T13 would include the same UE identifier as the first register request. As this message has integrity protection, it can confirm the value sent in step T2. Steps T14 to T18 may be the same as steps S14 to S18 of FIG. 2. In step T19, the S-CSCF 22 may ask the HSS to provide it with the profile of the user including the IMPUs and/or the IMPI. As a response, the HSS provides the IMPUs and/or IMPI to the S-CSCF. It should be appreciated that in the current specifications, the HSS is able to provide the user profile in a response to a message sent by the S-CSCF.

In steps T20 to T22, an OK message is sent by the S-CSCF to the user equipment. These messages include the public and/or private identities. The numbers or identities are stored in the user equipment.

Reference is now made to FIG. 4 which shows a further embodiment of the invention. Steps R1 to R19 are the same as described in relation to FIG. 3. However, the message sent in steps R20 to R22, the 200 OK message, does not include the private or public identities. Rather after the user equipment has been registered a process is carried out where the public and/or private identities are obtained. This is shown in FIG. 5.

In FIG. 5, the first step M1 a SUBSCRIBE message is by the user equipment 10 to the P-CSCF 16 With this, the user equipment subscribes to a registration state event, packet and uses the IMSI or derived value as identifier. In step M2, this is forwarded by the P-CSCF 16 to the S-CSCF 22. In step M3 a reply is sent from the S-CSCF 22 to the P-CSCF 16 and in step M4 the message is forwarded to the user equipment 10 by the P-CSCF 16. In step M5, the S-CSCF 22 sends a notify message to the P-CSCF 16 containing private and/or public identifiers. In step MT, the user equipment sends a reply, a 200 OK message, to the P-CSCF 16 which is forwarded to the S-CSCF 22 in step M8.

It should be appreciated that the user equipment may use one or more received public or private identifiers in subsequent signalling or can continue to use the IMSI or derived value in subsequent signalling.

The subscribe message contains a request for notification on the subscriber's registration state and it is acknowledged by a 200 OK message. In response to this request, the S-CSCF will send a notify message to the user including the IMPUs and/or IMPI which the user has agreed, with its network operator, to be registered upon a successful registration. It should be appreciated that the terminal may be preconfigured to send the subscribe message to its own registration state, using the IMSI, right after it has been registered. It should be appreciated that the S-CSCF 22 may obtain the IMPUs and/or IMPI information at any suitable time such as during downloading of subscriber profile from the HSS in step T19.

In one modification to the embodiments of the invention, as an alternative to using the IMSI number, an already GSM attached user equipment could use the temporary IMSI (TIMSI) or the like which the user equipment receive when attaching the GSM network. Any derived or temporary identity can be used that uniquely identifies the user for the network. The main benefit of a TIMSI or the like is that no one can see by eavesdropping the air interface) which user (that is which IMSI) registers to the IMS Preferred embodiments of the present invention have been described in the context of GPRS system and an IP multimedia system, It should be appreciated that embodiments of the present invention are not limited to these systems and may be used in any other system.

The invention claimed is:

1. An apparatus, comprising;
at least one processor; and
at least one memory including computer program code,
   the at least one memory and the computer program code configured to, with the at least one processor, cause the apparatus to perform at least the following:
   store, at a home subscriber server, at least one identity associated with a user equipment, the at least one identity being assigned to the user equipment for accessing an internet protocol multimedia system;
   receive, at the home subscriber server, identity information associated with the user equipment, the identity information being received from the user equipment;
   obtain, from the home subscriber server, the at least one identity associated with the user equipment, the at least one identity being obtained based at least on the received identity information; and
   send, to the user equipment, the at least one identity.

2. The apparatus as of claim 1, wherein the identity information is received from the user equipment when a secure connection has been established between the apparatus and the user equipment.

3. The apparatus as of claim 1, wherein the home subscriber server further stores an international mobile subscriber identity associated with the user equipment.

4. The apparatus as of claim 3, wherein the user equipment is configured to store the international mobile subscriber identity.

5. The apparatus as of claim 3, wherein the identity information comprises the international mobile subscriber identity associated with the user equipment and/or information derived therefrom.

6. The apparatus as of claim 1, wherein the identity information comprises a temporary identification.

7. The apparatus as of claim 5, wherein the user equipment is configured to store, in a subscriber identity module, the international mobile subscriber identity associated with the user equipment.

8. The apparatus as of claim 1, wherein the apparatus is associated with an internet protocol multimedia system.

9. The apparatus as of claim 8, wherein the receiving is performed by a call state control function.

10. The apparatus as of claim 9, wherein the receiving is performed by a serving call state control function.

11. The apparatus as of claim 1, wherein the apparatus is associated with a home network with which the user equipment is associated normally and a serving network which is one of the home network and a visited network.

12. The apparatus as of claim 11, wherein the at least one identity is stored at the home network.

13. The apparatus as of claim 1, wherein the user equipment is provided with information for identifying the apparatus.

14. The apparatus as of claim 1, wherein the user equipment is configured to store the at least one identity obtained from the apparatus.

15. A method, comprising:
   storing, at a home subscriber server, at least one identity associated with a user equipment, the at least one identity being assigned to the user equipment for accessing an internet protocol multimedia system;
   receiving, at the home subscriber server, identity information associated with the user equipment, the identity information being received from the user equipment;
   obtaining, from the home subscriber server, the at least one identity associated with the user equipment, the at least one identity being obtained based at least on the received identity information; and
   sending, to the user equipment, the at least one identity.

16. The method as of claim 15, wherein the identity information comprises one or more of an international mobile subscriber identity associated with the user equipment, information derived from the international mobile subscriber identity associated with the user equipment, and/or a temporary identification.

17. The method as of claim 15, wherein the at least one comprises an internet protocol multimedia public user identity or an internet protocol multimedia private user entity.

18. The method as of claim 16, wherein the user equipment is configured to store, in a subscriber identity module, the international mobile subscriber identity associated with the user equipment.

\* \* \* \* \*